United States Patent Office 2,719,838
Patented Oct. 4, 1955

2,719,838

AZOBIPHENYLCARBONYLAMINOANTHRA-QUINONE COMPOUNDS

Joseph Deinet, Glassboro, N. J., assignor to E. I du Pont de Nemours and Company, Wilmington, Del., a corporation of Delaware No Drawing. Application July 9, 1951,
Serial No. 235,891

6 Claims. (Cl. 260—157)

This invention relates to the preparation of new and valuable vat dyestuffs of the anthraquinone oxazole and anthraquinone thiazole series, and more particularly to new unsymmetrical azobiphenylcarbonylaminoanthraquinone compounds which contain in the molecule an anthraquinone-1,2(N)-oxazole or an anthraquinone-1,2(N)-thiazole group and which carry at least one sulfonic acid group in the anthraquinone radicals. The compounds of this invention have the general formula:

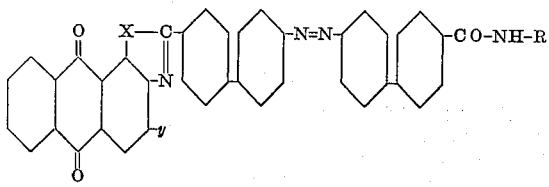

in which X stands for a member of the group consisting of O and S; y stands for a member of the group consisting of hydrogen, halogen, and the sulfonic acid group; and R stands for an anthraquinonyl radical which is unsubstituted or which carries a substituent of the group consisting of halogen, methyl, methoxy and benzoylamino groups—there being present in the molecule, as formulated, at least one sulfonic acid group attached to the beta position of one of the anthraquinone nuclei but in no case does either anthraquinone nucleus carry more than one sulfonic acid group. By the term "sulfonic acid group," I refer to the sulfonic acid group as such and to the alkali metal salts of such acid. More particularly, I refer to the more common sodium and potassium salts.

In United States Patents 2,559,669 and 2,587,908, a related group of vat dyes of the anthraquinone oxazole series is disclosed. These compounds dye cotton and related fibers from alkaline hydrosulfite vats in yellow shades which exhibit desirable brightness as well as good fastness properties. It has been found, however, that these dyes are deficient in printing properties, possibly because of poor solubility in the printing gum, for when printed they do not yield the strong and bright yellow shades characteristic of the vat dyeings of these colors.

It is, therefore, an object of the present invention to produce new and valuable dyes of the anthraquinone vat dye class which will print, as well as dye, cellulose and related fibers in desirable yellow shades and exhibit good brightness, tinctorial strength and fastness properties. It is a more specific object of the invention to produce anthraquinone dyes which are 4,4'-substituted azobiphenyl compounds carrying in the molecule both an aminoanthraquinone group and an anthraquinone oxazole or an anthraquinone thiazole group, one or both of said anthraquinone radicals carrying a sulfonic acid radical. It is a still further object of the invention to produce new valuable vat dyes of the anthraquinone series which may be produced from readily obtainable amino-anthraquinone sulfonic acids or amino-halogen-anthraquinone sulfonic acids.

The oxazole compounds are best prepared in a non-reactive medium by condensing 4,4'-azobiphenyl-4'',4'''-dicarboxylic acid chloride with a 2-amino-1-halogen anthraquinone or a 2-amino-1-halogen anthraquinone-sulfonic acid and further condensing the intermediate mono-acid chloride so obtained in situ with an amino-anthraquinone sulfonic acid or with an amino-anthraquinone, and then ring-closing to the oxazole compound in the presence of an acid binding agent and a catalyst at elevated temperature, preferably in the range of from 180° C. to 220° C.

Either the amino-anthraquinone containing halogen in its 1-position or the amino-anthraquinone not substituted in 1-position may be condensed first with the azobiphenyl-dicarbonyl chloride followed by condensation of the resulting mono carbonyl chloride with the amine of alternate choice and then ring-closure of the bis-amide to the oxazole amide end product. In an alternate route the oxazole ring of the mono carbonyl chloride is formed prior to condensation with the second mol of an amino-anthraquinone.

The thiazole compounds are best prepared by condensing 4,4'-azobiphenyl-4'',4'''-dicarboxylic acid chloride with an amino-anthraquinone sulfonic acid (mole per mole) and further condensing the intermediate mono acid chloride with a 2-amino-1-mercapto-(Na)-anthraquinone at elevated temperature preferably in the range of from 180° C. to 220° C. The products may be conditioned for dyeing or printing in the usual manner, such as by milling or acid pasting with or without purification by bleaching with sodium hypochlorite. These new dyes are generally yellow pastes which dye and print cotton or related fibers in strong bright shades and exhibit good light-fastness and tinctorial strength. Their wet-fastness is of the same high order as found in most anthraquinone vat colors.

The following examples are given to illustrate the invention. The parts used are by weight.

*Example 1*

1200 parts of nitrobenzene, 2 parts of pyridine, 50 parts of 4,4'-azobiphenyl-4'',4'''-dicarboxylic acid and 43 parts of thionyl chloride are heated to 98° C. to 100° C. under agitation and maintained for 12 to 20 hours. The mass is then air blown for one half hour to remove the excess of thionyl chloride. After cooling to 40° C., there are added 30.5 parts of 1-chloro-2-amino-anthraquinone. The mass is then heated to 140° C. and maintained for six hours. After cooling to 25° C., there are added 38.5 parts of 2-amino-anthraquinone-3-sulfonic acid (sodium salt). The reaction is then heated to 208° C. and maintained at this temperature for one hour. It is then cooled to 50° C. and 50 parts of sodium carbonate, 50 parts of potassium acetate, one part of cupric acetate and one part of cuprous chloride are added. The mass is heated to 208° C. to 210° C., and maintained for two and one-half hours. It is then cooled to 50° C., filtered, the filter cake washed with nitrobenzene, alcohol and hot water in turn and dried. The product is then acid pasted by drowning a concentrated sulfuric acid solution of the color in water, thereafter filtered, washed acid-free and purified by bleaching with sodium hypochlorite. It forms a bright yellow paste and dyes and prints cotton or related fibers in strong bright yellow shades of excellent fastness properties.

The dye has the formula:

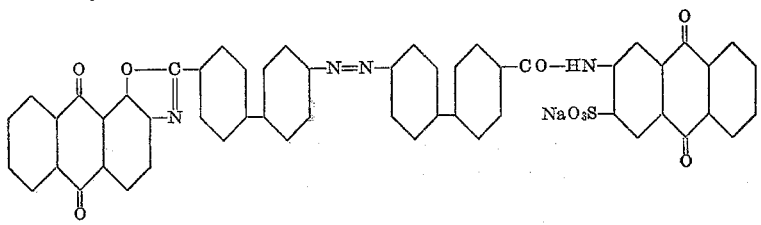

Example II

Fifty parts of 4,4'-azobiphenyl-4'',4'''-dicarboxylic acid are converted to the acid chloride as in Example I. 30.5 parts of 1-chloro-2-amino-anthraquinone are added and the mass heated to 138° C. to 140° C. and maintained at this temperature for six hours. The mass is then cooled to 50° C. and 40.5 parts of 1-amino-anthraquinone-6-sulfonic acid (K salt) are added. The reaction mass is then heated to 208° C. and maintained at this temperature for one and one-half hours. The mass is then cooled to 100° C. and 50 parts of sodium carbonate, 50 parts of potassium acetate, 1 part of cupric acetate and 1 part of cuprous chloride are added. The mass is then heated to 210° C. and maintained at this temperature for three hours. It is then cooled to 50° C., and the mass filtered, the filter cake washed with nitrobenzene, alcohol and hot water in turn and dried. The product is then acid pasted and purified by bleaching with sodium hypochlorite. It forms a bright yellow paste and dyes and prints cotton in strong bright yellow shades of excellent fastness properties. The dye in the form of the sodium salt has the formula:

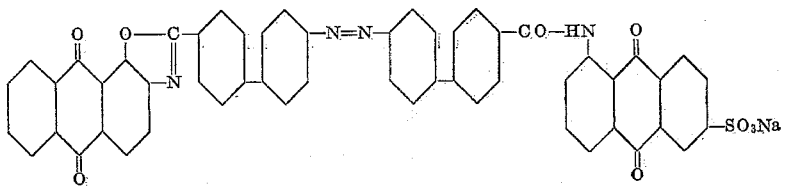

Example III 1250 parts of nitrobenzene, 2 parts of pyridine, 55 parts of 4,4'-azobiphenyl-4'',4'''-dicarboxylic acid (sodium salt) and 43 parts of thionyl chloride are heated together while agitating to 98° C. to 100° C. and maintained at this temperature for 12 to 20 hours. The mass is then air blown for one-half hour to remove excess of thionyl chloride. After cooling to 50° C., there are added 26.4 parts of 1-amino-anthraquinone and the mass heated to 138° C. to 140° C. and maintained at this temperature for six hours. After cooling to 50° C., there are added 50 parts of 1-bromo-2-amino-anthraquinone-3-sulfonic acid (K salt). The reaction mass is then heated to 208° C. and maintained at this temperature for one and one-half hours. The mass is then cooled to 100° C. and 50 parts of sodium carbonate, 50 parts of potassium acetate, one part of cupric acetate and one part of cuprous chloride are added. The mass is then heated to 210° C. and maintained for two and one-half hours. After cooling to 50° C., the mass is filtered and the filter cake washed with nitrobenzene, alcohol and hot water in turn and dried. The product is then acid pasted and purified by bleaching with sodium hypochlorite. It forms a bright yellow paste and dyes and prints cotton or related fibers in strong bright yellow shades of excellent fastness properties.

The dye in the form of the sodium salt has the formula:

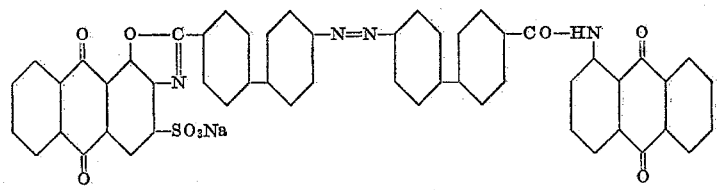

Example IV

Fifty-five parts of 4,4'-azobiphenyl-4'',4'''-dicarboxylic acid (sodium salt) are converted to the acid chloride as in Example III. 38.5 parts of 2-amino-anthraquinone-3-sulfonic acid (Na salt) are added and the mass heated to 170° C. and maintained for two hours. The mass is then cooled to 50° C. and 48 parts of 1-bromo-2-amino-anthraquinone-3-sulfonic acid (sodium salt) are added. The reaction mass is then heated to 208° C. and maintained at this temperature for one and one-half hours. The mass is then cooled to 100° C. and 50 parts of sodium carbonate, 50 parts of potassium acetate, 1 part of cupric acetate and 1 part of cuprous chloride are added. The mass is then heated to 210° C. and maintained for three hours. After cooling to 50° C. the mass is filtered and the filter cake washed with nitrobenzene, alcohol and water in turn and dried. The product is then acid pasted and purified by bleaching with sodium hypochlorite. It forms a bright yellow paste and dyes and prints cotton in strong bright shades of excellent fastness properties.

The dye has the formula:

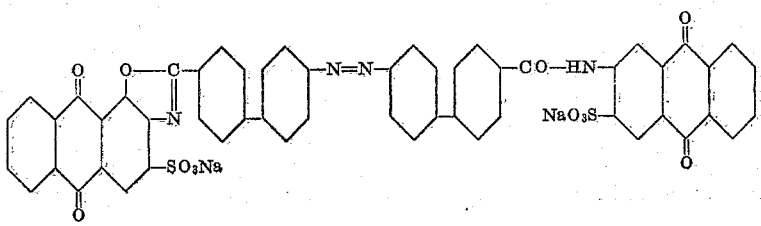

Example V

Fifty-five parts of 4,4'-azobiphenyl-4",4'''-dicarboxylic acid (sodium salt) are converted to the acid chloride as in Example III. 26.5 parts of 2-amino-anthraquinone are added and the mass heated to 140° C. and maintained at this temperature for six hours. The mass is then cooled to 50° C. and 48 parts of 1-bromo-2-amino-anthraquinone-3-sulfonic acid (Na salt) are added. The reaction mass is then heated to 208° C. and maintained for one and one-half hours. The mass is then cooled to 100° C. and 50 parts of sodium carbonate, 50 parts of potassium acetate, one part of cupric acetate and one part of cuprous chloride are added. The mass is then heated to 210° C. and maintained for three hours. After cooling to 50° C., the mass is filtered and the filter cake washed with nitrobenzene, alcohol and water in turn and dried. The product is then acid pasted and purified by bleaching with sodium hypochlorite. It forms a bright yellow paste and dyes and prints cotton in strong bright shades of excellent fastness properties.

The dye has the formula:

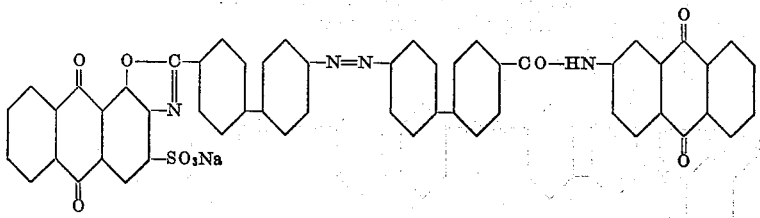

Example VI

Fifty-five parts of 4,4'-azobiphenyl-4",4'''-dicarboxylic acid (sodium salt) are converted to the acid chloride as in Example III. 38.5 parts of 2-amino-anthraquinone-3-sulfonic acid (Na salt) are added and the mass heated to 170° C. and maintained for three hours. The mass is then cooled to 50° C. and 33 parts of 1-mercapto-(Na)-2-amino-anthraquinone are added. The reaction mass is then slowly heated to 208° C. and maintained for one hour. After cooling to 50° C., the mass is filtered and the filter cake washed with nitrobenzene, alcohol and hot water in turn and dried. The product is then acid pasted and purified by bleaching with sodium hypochlorite. It forms a yellow paste and dyes and prints cotton or related fibers in strong bright yellow shades of excellent fastness properties.

The dye has the formula:

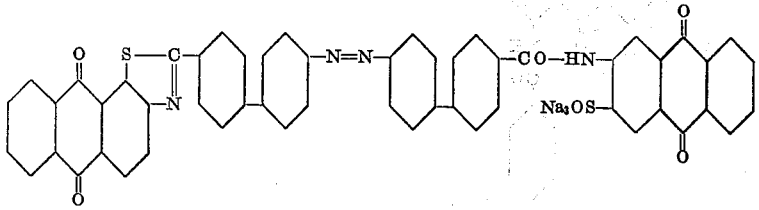

Example VII

Fifty-five parts of 4,4'-azobiphenyl-4",4'''-dicarboxylic acid (sodium salt) are converted to the acid chloride as in Example III. 38.5 parts of 2-amino-anthraquinone-3-sulfonic acid (Na salt) are added and the mass heated to 170° C. and maintained at this temperature for three hours. The mass is then cooled to 25° C. and 30.5 parts of 1-chloro-2-amino-anthraquinone are added. The mass is then heated to 208° C. and maintained at this temperature for one and one-half hours. The mass is then cooled to 100° C. and 50 parts of sodium carbonate, 50 parts of potassium acetate, one part of cupric acetate and one part of cuprous chloride are added. The mass is then heated to 210° C. and maintained at this temperature for three hours. After cooling to 50° C., the mass is filtered and the filter cake is washed with nitrobenzene, alcohol and water in turn and dried. The product is then acid pasted and purified by bleaching with sodium hypochlorite. It forms a bright yellow paste and is identical with that of Example I.

Example VIII 1200 parts of nitrobenzene, 2 parts of pyridine, 55 parts of 4,4'-azobiphenyl-4",4'''-dicarboxylic acid chloride and 30.8 parts of 1-amino-6-chloro-anthraquinone are heated together while agitating to 160° C. to 165° C. and maintained for one and one-half hours. The mass is then cooled to 50° C. and 49 parts of 1-bromo-2-amino-anthraquinone-3-sulfonic acid (sodium salt) are added. The reaction mass is then heated to 208° C. and maintained for one hour. It is then cooled to 100° C. and 50 parts of sodium carbonate, 50 parts of potassium acetate, one part of cupric acetate and one part of cuprous chloride are added. The mass is then heated to 208° C. to 210° C. and maintained for two hours. It is then cooled to 50° C., filtered, and the cake washed with nitrobenzene, alcohol, and hot water in turn and then dried. The product is then acid pasted and purified by bleaching with sodium hypochlorite. It forms a yellow paste and dyes and prints cotton and related fibers in strong bright yellow shades of excellent fastness properties.

The dye has the formula:

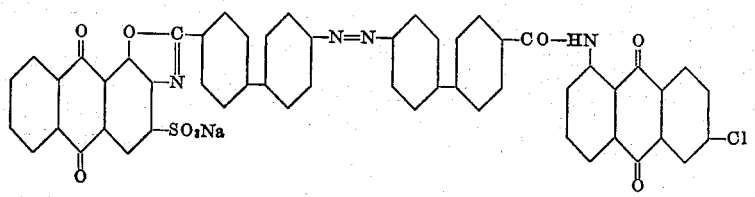

Example IX 1200 parts of nitrobenzene, 2 parts of pyridine, 55 parts of 4,4'-azobiphenyl-4",4'''-dicarboxylic acid chloride and 32.5 parts of 1-amino-anthraquinone-6-carboxylic acid are heated together to 170° C. and maintained for four hours. The mass is then cooled to 50° C. and 49 parts of 1-bromo-2-amino-anthraquinone-3-sulfonic acid (sodium salt) are added. The mass is then heated to 205° C. and maintained for one and one-half hours. It is then cooled to 100° C. and 50 parts of sodium carbonate, 50 parts of potassium acetate, one part of cupric acetate and one part of cuprous chloride are added. The mass is then heated to 210° C. and maintained at this temperature for two and one-half hours. It is then cooled to 50° C., filtered, and the filter cake washed with nitrobenzene, alcohol, and hot water in turn and dried. The product is then acid pasted and purified by bleaching with sodium hypochlorite. It forms a bright yellow paste and dyes and prints cotton in strong bright yellow shades of excellent fastness properties.

The dye has the formula:

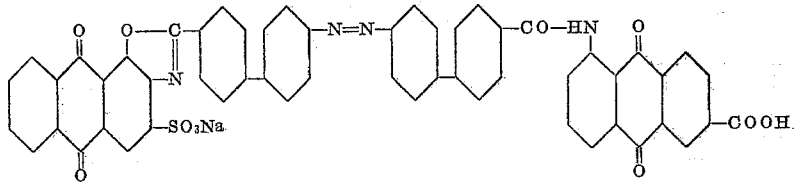

Example X 1200 parts of nitrobenzene, 2 parts of pyridine, 50 parts of 4,4'-azobiphenyl-4'',4'''-dicarboxylic acid chloride and 37.5 parts of 1-amino-5-benzoylaminoanthraquinone are heated together while agitating to 170° C. The mass is then cooled to 60° C. and 44 parts of 1-bromo-2-amino-anthraquinone-3-sulfonic acid (sodium salt) are added. The mass is then heated to 205° C. and maintained for one hour. It is then cooled to 100° C. and 50 parts of sodium carbonate, 50 parts of potassium acetate, one part of cupric acetate and one part of cuprous chloride are added. The mass is then heated to 210° C. and maintained for two and one-half hours. It is then cooled to 50° C., filtered, and the filter cake washed with nitrobenzene, alcohol and hot water in turn and dried. The product is then acid pasted and purified by bleaching with sodium hypochlorite. It forms a bright yellow paste and dyes and prints cotton in strong bright yellow shades of excellent fastness properties.

The dye has the formula:

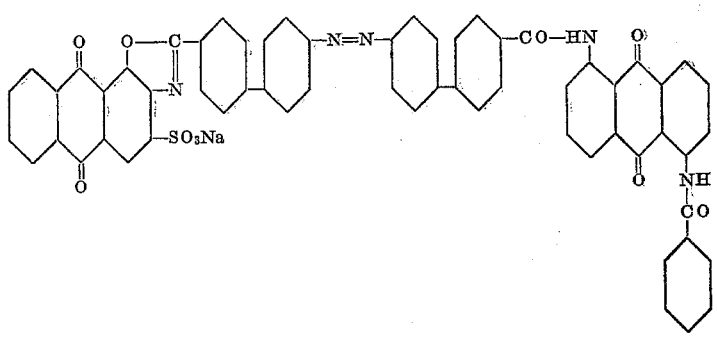

Example XI 1,000 parts of nitrobenzene, 1 part of pyridine, 30 parts of 1-chloro-2-amino-anthraquinone and 56 parts of 4,4'-azobiphenyl-4'',4'''-dicarboxylic acid chloride are heated together at 135° C. to 140° C. and maintained for six hours. The mass is then cooled to 30° C. and 38.5 parts of 2-amino-anthraquinone-6-sulfonic acid (Na salt) fine powder are added and the mass is heated to 205° C. and maintained for one and one-half hours. The mass is then cooled to 120° C. and 50 parts of sodium carbonate, 50 parts of potassium acetate, 1 part of cupric acetate and 1 part of cuprous chloride are added. The mass is then heated to 210° C. and maintained at this temperature for three and one-half hours. The reaction mass is then cooled to 50° C., filtered, the filter cake washed with nitrobenzene, alcohol and water in turn and dried. The product, upon acid pasting and bleaching with sodium hypochlorite, forms a bright yellow paste and dyes and prints cotton in bright yellow shades of excellent fastness properties.

The dye has the formula:

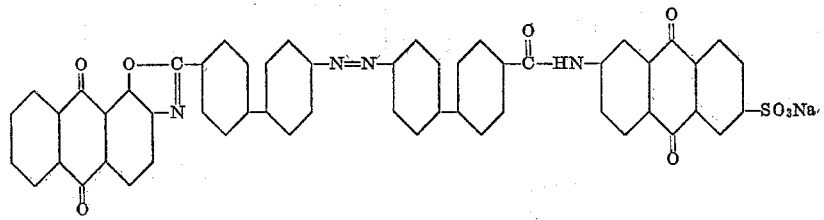

Example XII 1,000 parts of nitrobenzene, 2 parts of pyridine, 42.2 parts of 4,4'-azobiphenyl-4'',4'''-dicarboxylic acid and 40 parts of thionyl chloride are heated together to 98° C. and maintained at this temperature for fifteen hours. The mass is then air blown for one hour to remove excess of thionyl chloride. After cooling to 50° C., there are added 32.5 parts of 2-amino-anthraquinone-3-sulfonic acid (sodium salt) fine powder and the mass is heated to 200° C. and maintained at this temperature for one hour. The mass is then cooled to 50° C. and 48.3 parts of 1,3-dibromo-2-amino-anthraquinone-6-sulfonic acid (sodium salt) fine powder are added and the mass is heated to 210° C. and maintained at this temperature for one and one half-hours. The mass is then cooled to 50° C. and 45 parts of sodium carbonate, 45 parts of potassium acetate, 1 part of cupric acetate and 1 part of cuprous chloride are added. The mass is then heated to 210° C. and maintained at this temperature for three hours. The reaction mass is then cooled to 50° C., filtered, the filter cake washed with nitrobenzene, alcohol and water in turn and dried. The product, upon acid pasting and bleaching with sodium hypochlorite forms bright yellow paste and dyes and prints cotton in bright yellow shades.

The dye has the formula:

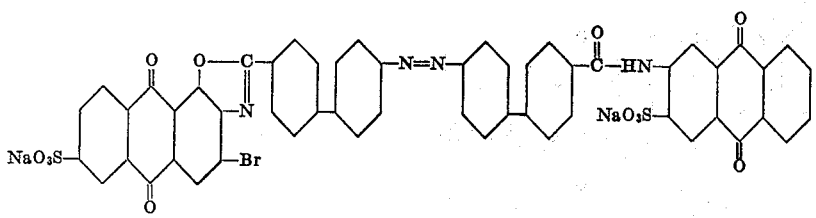

When 2-amino-anthraquinone-3-sulfonic acid (Na salt) in the above example is replaced by 2-amino-anthraquinone-6-sulfonic acid (Na salt), one obtains the product having the following formula:

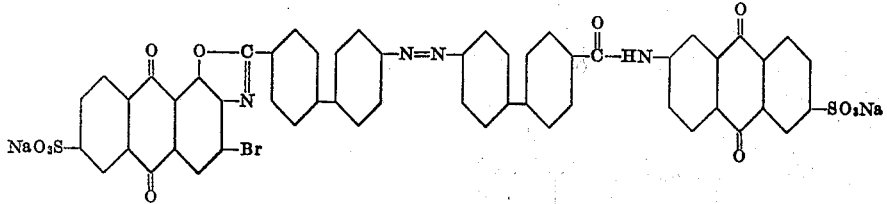

This product, upon acid pasting and bleaching with sodium hypochlorite, forms a bright yellow paste and dyes and prints cotton or related fibers in bright yellow shades of excellent fastness properties.

As illustrated in the above examples, the dyes of this invention may carry one or two sulfonic acid groups but when two sulfonic acid groups are present, they should not be in the same anthraquinone nucleus. In preparing these compounds, particularly where the amino-anthraquinone carries the sulfonic acid group in either the 6 or 7 position, the normal occurring mixture of 1-amino-6 and 7-sulfo-anthraquinone or the 2-amino-6 and 7-sulfoanthraquinone may be employed or they may be separated and the individual isomers may be employed as desired.

The specific examples given above are merely illustrative of the general invention which is formulated in the introduction of the specification. Other substituted 1-mercapto-2-amino-anthraquinones may be employed in place of the one specifically disclosed in Example VI including sulfonic acid derivatives of such compounds. 1-Mercapto - 2 - amino - anthraquinone - 3 - sulfonic acid is an available intermediate illustrating this latter class. In the anthraquinone thiazole substituted azobiphenyl compounds of this invention, the carbonyl-aminoanthraquinone group may be any of those groups disclosed in the specific examples illustrating the oxazole types or any of the further substituted compounds hereinafter mentioned.

In preparing the compounds containing the oxazole ring, any of the 1,3-dihalogen-2-amino-anthraquinone compounds which are available may be employed such as the 1,3 - dichloro - 2 - amino - anthraquinone; 1,3-dibromo - 2 - amino - anthraquinone; 1 - bromo - 2 - amino - 3 - chloroanthraquinone; and 1 - chloro - 2-amino - 3 - bromoanthraquinone. If it is desired that further halogen be present in the anthraquinone radical, which forms the oxazole portion of the molecule, higher halogen substituted 2-amino-anthraquinone compounds may be employed.

The anthraquinone group connected with the carbonyl-amino radical may carry other monovalent substituents such as halogen, methyl methoxy, carboxylic and benzoylamino radicals. The aminoanthraquinones carrying these radicals are readily available anthraquinone vat dye intermediates. Further illustrative of the aminoanthraquinones that may be used in the above examples in place of those specifically mentioned are 1-amino-4-methoxyanthraquinone; 1-amino-4- or 8-benzoylamino-anthraquinone; and 1-amino-2-methyl-anthraquinone. Although chlorine and bromine are the typical examples of the halogen substituents remaining in the anthraquinone nucleus of the dyestuff, it will be obvious that, if desired, other halogen substituted aminoanthraquinones may be employed to produce dyes which contain in the final dyestuff other halogens.

Because of the presence of the sulfonic acid group in the compounds of this invention, they can be purified by vatting without acid pasting, and if desired they may be bleached with sodium hypochlorite directly in the alkaline vat solution, although, as illustrated in the examples, the usual acid pasting and hypochlorite bleach may be used.

I claim:
1. Compounds of the formula:

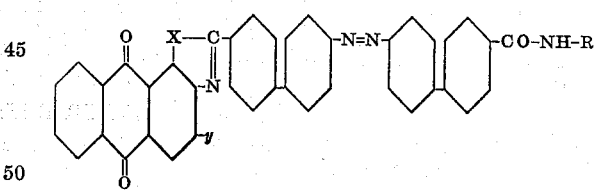

in which X stands for a member of the group consisting of O and S; y stands for a member of the group consisting of hydrogen and halogen and —SO₃M; and R stands for an anthraquinonyl radical of the group consisting of the unsubstituted anthraquinonyl radical and the anthraquinonyl radical which carries a substituent of the group consisting of halogen, methyl, methoxy and benzoylamino groups, there being present in the molecule at least one —SO₃M group attached in the beta position to one of the anthraquinone nuclei but in which neither anthraquinone nucleus carries more than one —SO₃M group, and in which M in each case stands for an element of the group consisting of hydrogen and an alkali metal.

2. The compound of the formula:

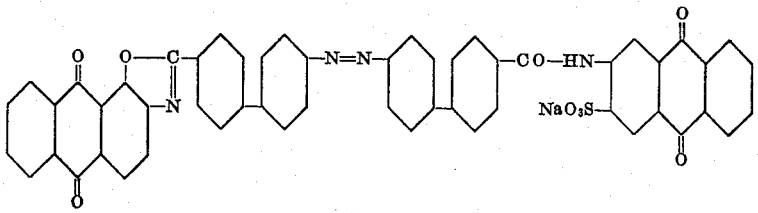

3. The compound of the formula:
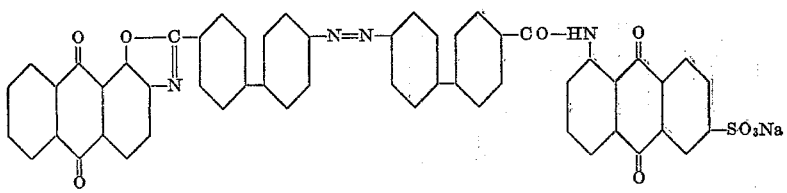
4. The compound of the formula:
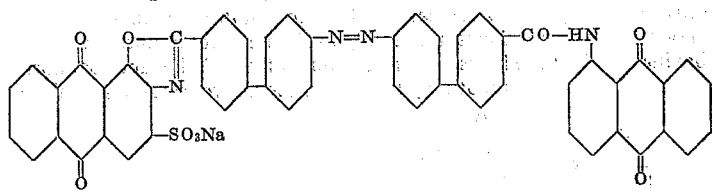
5. The compound of the formula:
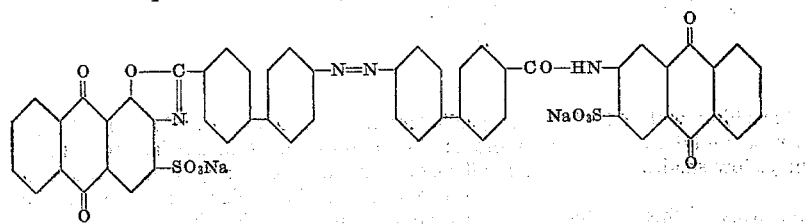
6. The compound of the formula:
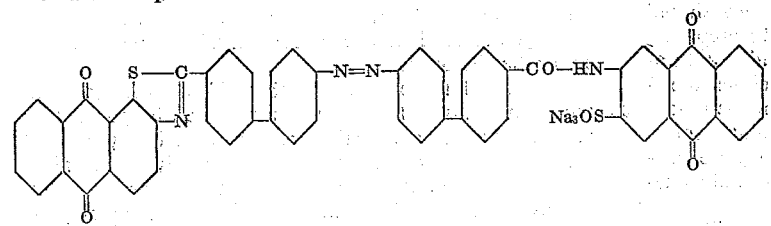
References Cited in the file of this patent
UNITED STATES PATENTS
| | | |
|---|---|---|
| 2,108,126 | Honold et al. | Feb. 15, 1938 |
| 2,145,954 | Semple et al. | Feb. 7, 1939 |
| 2,395,229 | Lowe et al. | Feb. 19, 1946 |
| 2,559,669 | Schroeder et al. | July 10, 1951 |
OTHER REFERENCES
Georgievics et al., "Dye Chemistry," 1920, pp. 6 and 7.